US008558894B2

(12) United States Patent
Tan et al.

(10) Patent No.: US 8,558,894 B2
(45) Date of Patent: Oct. 15, 2013

(54) SUPPORT FOR AUDIENCE INTERACTION IN PRESENTATIONS

(75) Inventors: Kar-Han Tan, Sunnyvale, CA (US); Bowon Lee, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 12/947,191

(22) Filed: Nov. 16, 2010

(65) Prior Publication Data

US 2012/0124602 A1  May 17, 2012

(51) Int. Cl.
*H04N 5/225* (2006.01)
(52) U.S. Cl.
USPC ........... 348/169; 348/170; 348/171; 348/172; 348/173; 348/174; 348/175; 348/176; 348/177; 348/178; 348/179; 342/75
(58) Field of Classification Search
USPC ............... 348/169, 170–172, 175–176; 725/9
See application file for complete search history.

(56) References Cited

U.S. PATENT DOCUMENTS

| | | | | |
|---|---|---|---|---|
| 5,764,276 A * | 6/1998 | Martin et al. | ................ | 725/146 |
| 6,282,462 B1 * | 8/2001 | Hopkins | ...................... | 700/259 |
| 7,694,213 B2 * | 4/2010 | Kuwabara et al. | ............ | 715/201 |
| 2002/0135536 A1 * | 9/2002 | Bruning | ......................... | 345/1.1 |
| 2003/0160862 A1 * | 8/2003 | Charlier et al. | ............ | 348/14.08 |
| 2003/0172020 A1 * | 9/2003 | Davies et al. | .................... | 705/36 |
| 2004/0008423 A1 * | 1/2004 | Driscoll et al. | ............... | 359/725 |
| 2004/0263636 A1 * | 12/2004 | Cutler et al. | ............. | 348/211.12 |
| 2009/0322915 A1 * | 12/2009 | Cutler | .......................... | 348/251 |
| 2011/0295392 A1 * | 12/2011 | Cunnington et al. | ........... | 700/90 |

OTHER PUBLICATIONS

Nishiura, Takanobu et al., "Automatic Steering of Microphone Array and Video Camera Toward Multi-Lingual Tele-Conference Through Speech-to-Speech Translation", *2001 IEEE International Conference on Multimedia and Expo*, ISBN 0-7695-1198-8/01 , pp. 569-572.

* cited by examiner

*Primary Examiner* — Andy Rao
*Assistant Examiner* — Shan Elahi

(57) ABSTRACT

A method for presentation interaction. The method includes, receiving by a computer system an indication of a manual selection of a region proximate to an audience member of an audience wherein the indication is received via an interaction with a displayed image of the audience. The method also includes utilizing a microphone array communicatively coupled with a beam-forming component of the computer system to focus audio pickup from the region proximate to the audience member in response to receiving the indication. The method also includes displaying an enhanced image of the region proximate to the audience member using the computer system in response to receiving the indication.

16 Claims, 8 Drawing Sheets

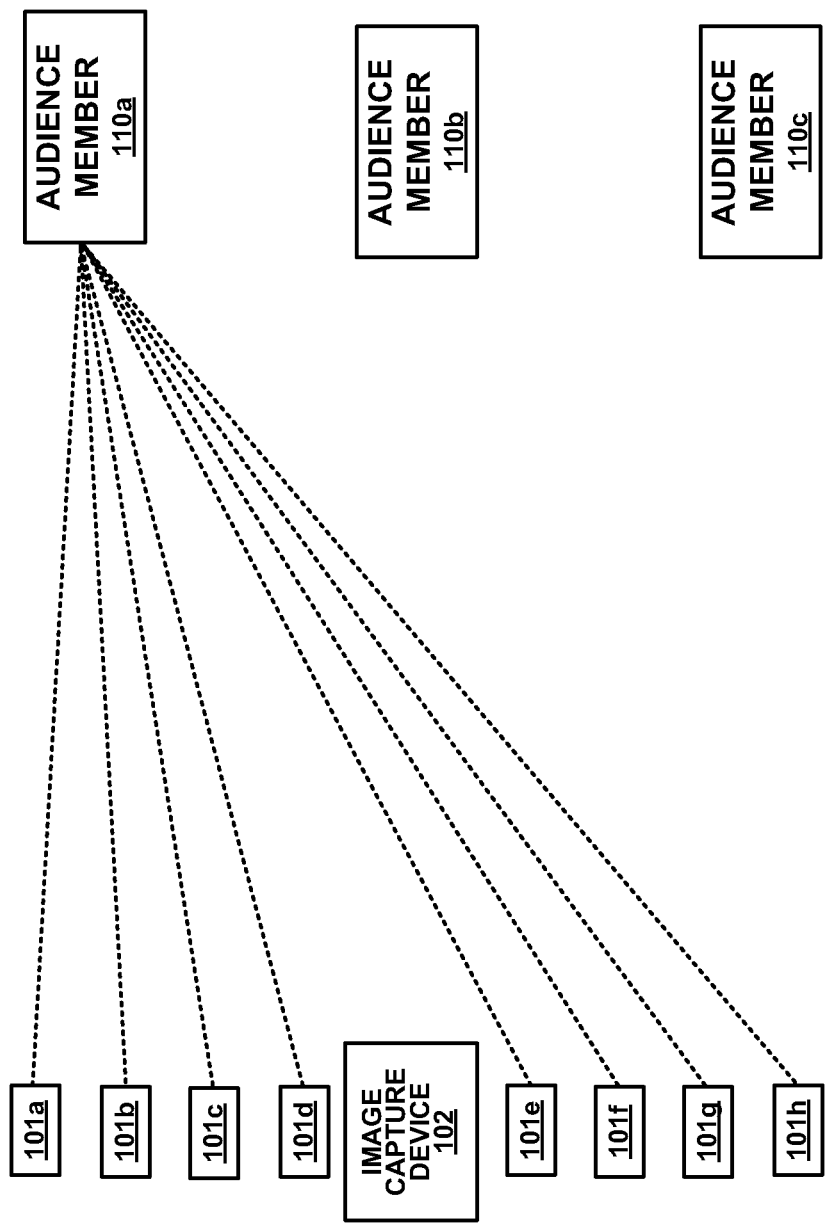

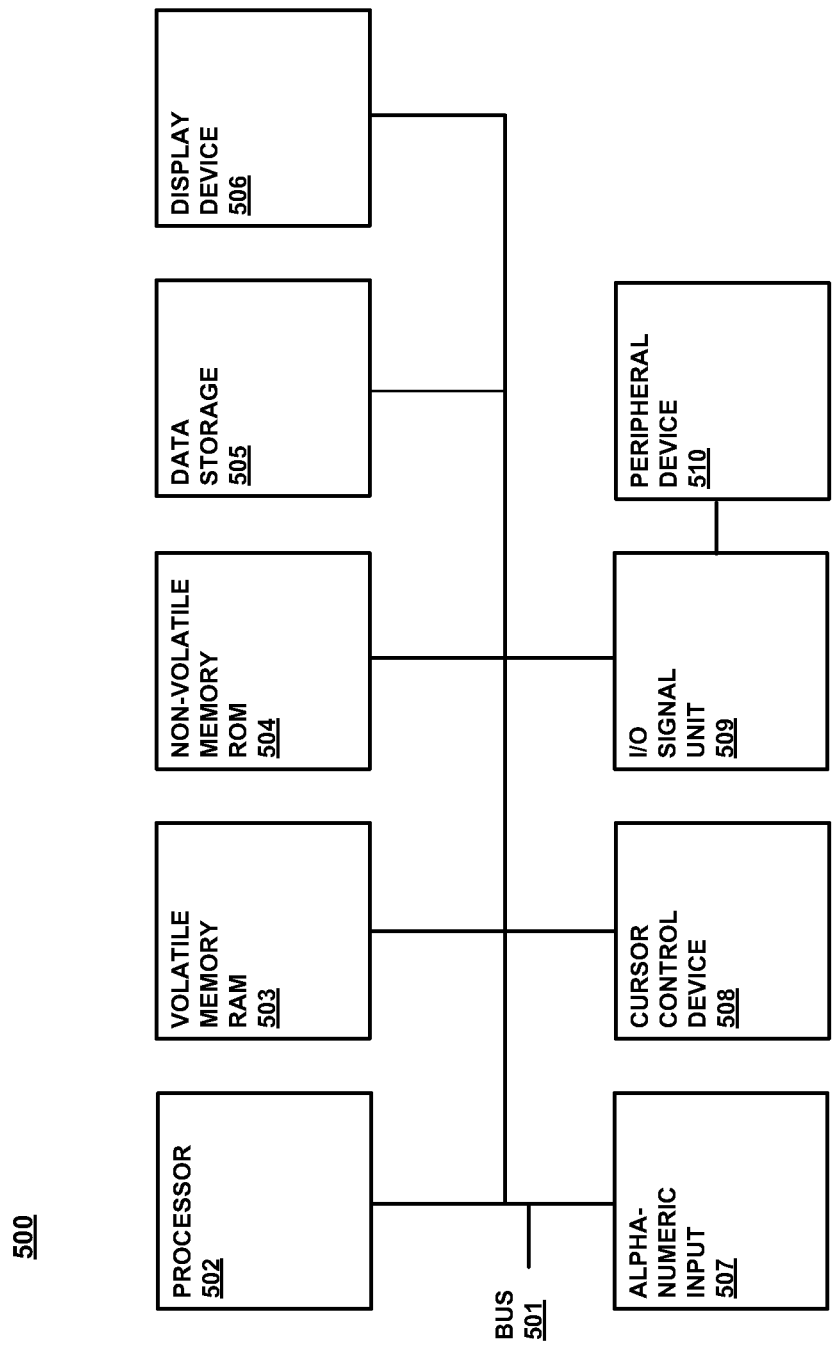

SUPPORT FOR AUDIENCE INTERACTION IN PRESENTATIONS

BACKGROUND

In some presenter/audience situations (e.g., seminars, conventions, large scale meetings, etc.), a computer-projector system is used to display an image of the presenter on a large screen in front of the audience to permit the audience to see the presenter more clearly. When an audience member wants to speak to the presenter, or present a question, it is difficult for the presenter, or other audience members to hear what that audience member is saying. To overcome this problem, the audience member either has to walk up to a microphone and speak, or roving microphones are provided which the audience member can use. Additionally, it is sometimes difficult for other audience members to find who is speaking when another audience member is speaking.

BRIEF DESCRIPTION OF THE DRAWINGS

FIGS. 3A and 3B illustrate a localization procedure of an audience member in accordance with one embodiment.

FIG. 5 is a block diagram of an example computer system in accordance with an embodiment.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
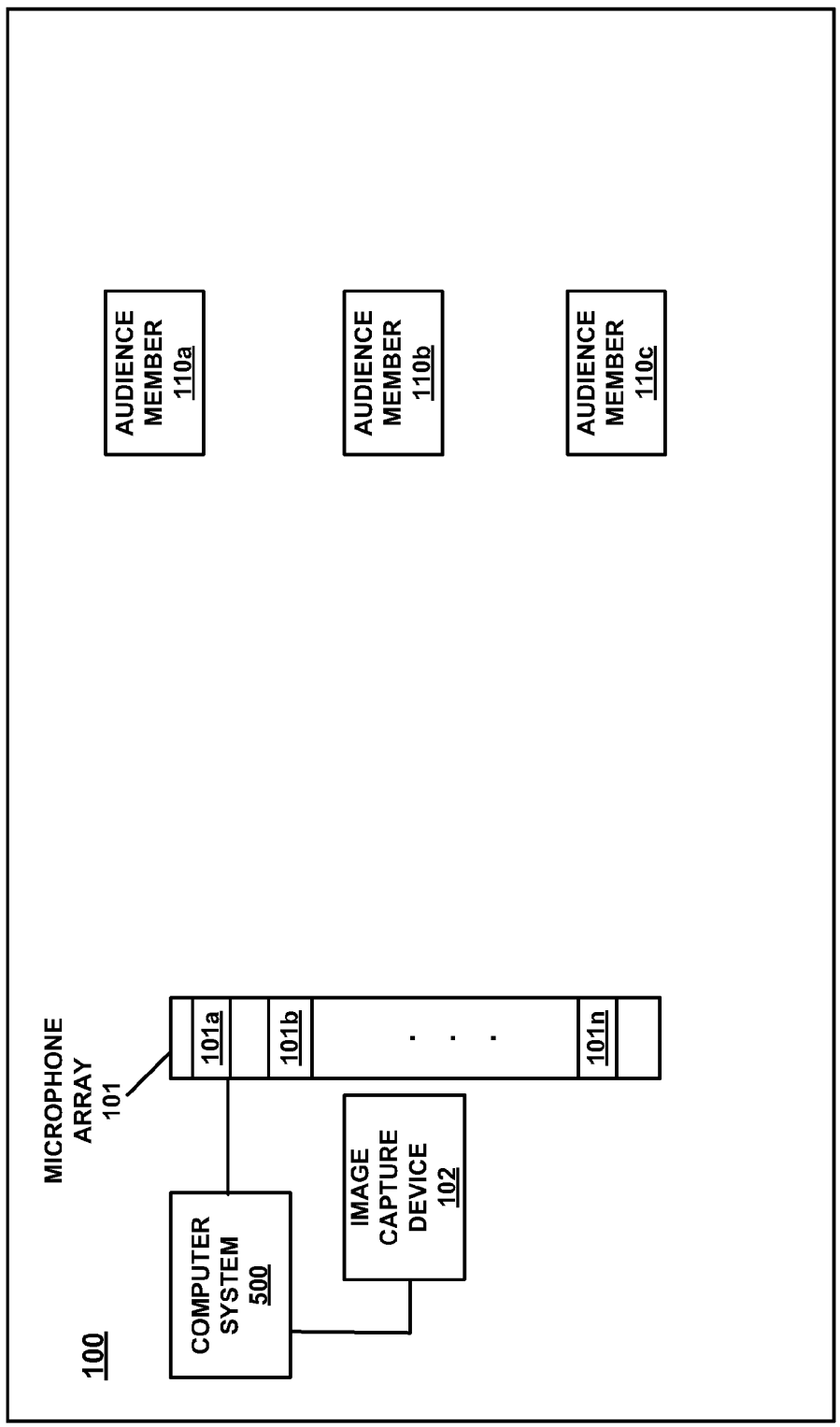
FIG. 1 illustrates an example of a meeting space, in accordance with an embodiment.

FIG. 1 depicts an example of a meeting space, in accordance with an embodiment. In FIG. 1, meeting space 100 comprises a plurality of audience members (e.g., audience member 110a, 110b, and 110c) of an audience. Meeting space 100 further comprises a computer system 500 which is used to implement a presentation system (e.g., presentation management system 204 of FIG. 2). In FIG. 1, computer system 500 is communicatively coupled with a microphone array 101 comprising a plurality of microphones (e.g., 101a, 101b . . . 101n). Computer system 500 is also communicatively coupled with an image capture device 102. In various embodiments, computer system 500 is used to process signals from microphone array 101 and image capture device 102.

In operation, a user of computer system 500 (e.g., a presenter of a conference) can control operation of microphone array 101 and image capture device 102. It is noted that there is no requirement that computer system 500 be disposed within meeting space 100. For example, the presenter can use computer system 500 to view audience members who are remotely located in meeting space 100, or in multiple meeting spaces 100. When one of the audience members in meeting space 100 speaks, the presenter can use computer system 500 to select that audience member. In response, computer system 500 remotely controls microphone array 101 to better capture the speaker's voice. Computer system 500 can also remotely control image capture device 102 to capture an enhanced image of the speaker (e.g., a zoom-in view of the speaker, or a higher resolution image of the speaker). It is noted that embodiments are not limited to remote conferencing alone and that the presenter using computer system 500 may be in meeting space 100 as well. This permits the presenter to better interact with participants of the meeting without the necessity of passing microphones between audience members, or the use of roving microphones.

In one embodiment, microphone array 101 comprises a linear array of microphones in any configuration which is situated at the front of meeting space 100. For example, microphone array 101 can comprise a linear array of 8 microphones disposed at a uniform spacing of 15 centimeters. It is noted that embodiments are not limited to this configuration of microphone array 101 including linear, spherical, planar, etc. For example, other numbers and spacing of microphones can be utilized in various embodiments. Furthermore, it is noted that microphone array 101 can be disposed to other locations of meeting space 100 besides centered at the front of the meeting space. For example, it can be structured such that there can be groups of microphone arrays in different configurations throughout the meeting space. In one embodiment, microphone array 101 comprises a steerable microphone array. As an example, microphones 101a, 101b . . . 101n can be disposed upon a boom which is moveable about an axis (e.g., azimuth and/or elevation). In one embodiment, movement of the steerable microphone array is controlled by computer system 500 in response to a manual selection of an audience member. In another embodiment, microphone array 101 is "steered" electronically using beam-forming component 201 as described below.

In one embodiment, image capture device 102 comprises a digital movie camera. In one embodiment, image capture device 102 further comprises a steerable image capture device which is moveable about an axis (e.g., azimuth and/or elevation). In one embodiment, image capture device 102 is capable of zooming in upon a selected subject. In one embodiment, movement of the steerable image capture device is controlled by computer system 500 in response to a manual selection by the presenter which indicates a particular audience member, or a region proximate to a particular audience member. In one embodiment, microphone array 101 and image capture system 102 are steered simultaneously and can be co-mounted, for example, on the same tripod.

Figure 2:
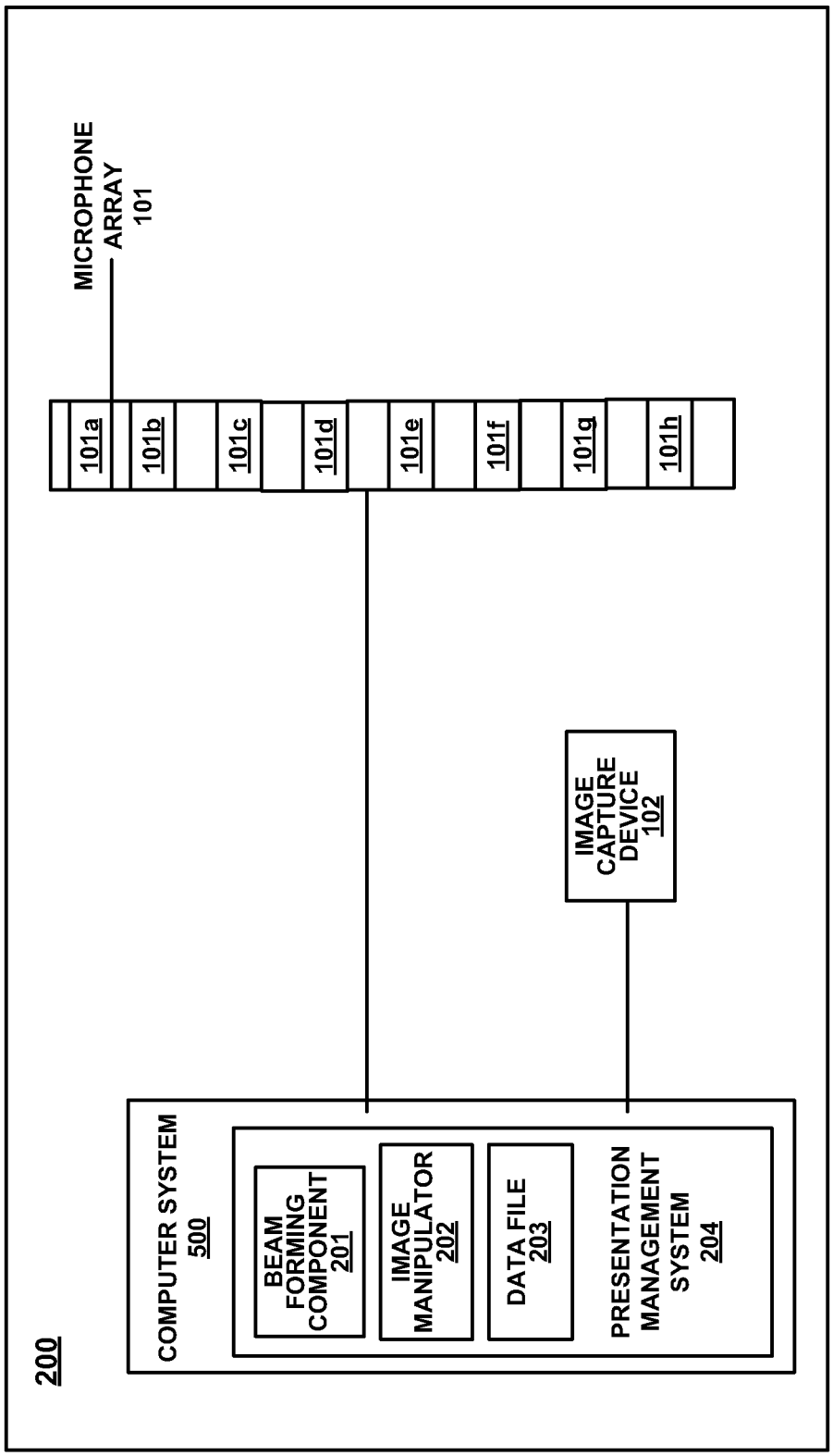
FIG. 2 illustrates an example of a presentation system, in accordance with an embodiment.

FIG. 2 illustrates an example of a presentation system 200, in accordance with an embodiment. In FIG. 2, computer system 500 comprises a presentation management system 204. In one embodiment, presentation management system 204 comprises a beam-forming component 201 and an image manipulator 202. Beam-forming technology refers to differential processing of audio signals arriving at a plurality of microphones from an audio source (e.g., "Microphone Arrays: Signal Processing Techniques and Applications," Michael Brandstein and Darren Ward (Eds.), Springer, 2001). In one embodiment (e.g., FIGS. 3A and 3B), image capture device 102 is located at the center of microphone array 101. This permits using knowledge of the viewing angle of image capture device 102 to determine the time delay of arrival (TDOA) of sound signals from an audience member to the individual microphones comprising microphone array 101. In other words, knowledge of the direction from microphone array 101 to a selected audience member is used in embodiments to enhance the focus of audio pickup from that audience member. In another embodiment, knowledge of the direction and distance from microphone array 101 to the selected audience member is used to enhance the focus of audio pickup from that audience member. For example, when an area of the wide-angle view of the audience is designated by the presenter via the presentation management system 204, corresponding pixel values can be mapped to any place in the three-dimensional location given the microphone array positions and camera's position and its viewing angle. TDOA can be computed using the set of known positions to further determine proper delay values for beam-forming. In one embodiment, beam-forming component 201 is configured to implement, but is not limited to, a delay-and-sum beam-forming to focus capture of audio signals such as speech from a selected audience member.

Delay-and-sum beam-forming is based upon the theory that an audio signal will reach each of a plurality of microphones at a slightly different time. In other words, while the signal from the sound source is the same, the signal at each microphone is delayed based upon the distance from each microphone to the source of the audio signal. Delay-and-sum beam-formers essentially selectively delay the output from the microphones and sum the signal to improve sound capture and reduce background noise. Using delay-and-sum beam-forming permits beam-forming component 201 to essentially place a microphone in the vicinity of the selected audience member without physically moving or placing a microphone. In one embodiment, after implementing delay-and-sum beam-forming, beam-forming component 201 performs an Ephraim and Malah noise suppression algorithm to processed audio signals for speech enhancement.

In one embodiment, image manipulator 202 is configured for processing of data from image capture device 102. As will be discussed in greater detail below, in one embodiment, a user (e.g., a presenter of a conference) manually selects an audience member, or selects a region proximate to a particular audience member, using computer system 500. In response to an indication of the selection of the audience member, image manipulator 202 concurrently displays an enhanced image of the selected audience member which in some manner highlights the selected audience member, or the region indicated by the presenter. In one embodiment, presentation management system 204 can be used by the presenter to control a wide-angle view of meeting space 100 so that the presenter can control which portion of meeting space will be focused upon. In other words, the presenter can use presentation management system 204 to control the field of view of image capture device 102. As an example, the field of view of displayed on computer system 500 may show audience members 110a and 110b. Using presentation management system 204, the presenter can shift the field of view of image capture device 102 such that audience members 110b and 110c are displayed on computer system 500. In one embodiment, in response to receiving an indication of the selection of an audience member by the presenter, presentation management system 204 simultaneously displays a magnified view of the selected audience member. This magnified or zoomed-in view, of the selected audience member is embedded within the displayed view of the audience in one embodiment. In other words, while the view of the audience is displayed to the presenter, an enlarged view of the selected audience member is simultaneously displayed as well. While the above description discusses displaying a magnified view of an audience member, embodiments may display a magnified view of the audience member and a region surrounding, or proximate to, that audience member also.

In general, presentation management system 204 is used by the presenter to select an audience member, or region, in meeting space 100 for display on computer system 500. It is noted that the image displayed on display device 506 of computer system 500 is not necessarily the image that is displayed to the other participants at the meeting. In other words, when a presenter is controlling the selection of an audience member, some of the information displayed by computer system 500 may not be presented to other participants/audience members of the meeting. Additionally, computer system 500 can be used to control the output of audio and visual data for presentation at a meeting or conference.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "accessing," "receiving," "utilizing," "using," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example Computer System

With reference to FIG. 5, embodiments are comprised of computer-readable and computer-executable instructions that reside, for example, in computer system 500. It is appreciated that computer system 500 of FIG. 5 is presented as an example only and that embodiments can operate within a number of different computer systems including general-purpose computer systems, embedded computer systems, laptop computer systems, hand-held computer systems, and stand-alone computer systems.

In the present embodiment, computer system 500 includes an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In the embodiment of FIG. 5, beam forming component 201, image manipulator 202, data file 203 and other components of presentation management system 204 are implemented by executing computer-readable instructions residing in, for example, volatile main memory 503 which causes processor 502 and/or other components of computer system 500 to carry out the instructions. It should be noted that the computer-readable and executable instructions for presentation management system 204 can be stored either in volatile memory 503, data storage device 505, or in an external storage device (not shown). In addition, computer system 500 may also include a data storage device 505 (e.g., a magnetic, optical, floppy, or tape drive or the like) for storing vast amounts of data. It is noted that data storage device 505 comprises or can receive a removable data storage device in one embodiment. Some non-limiting examples of a removable storage device include a Digital Versatile Disk (DVD) and a Compact Disk Read Only Memory (CD-ROM). It is appreciated that computer-readable and executable instructions for presentation management system 204 can also be stored on such removable computer-readable storage media.

Devices which are optionally coupled to computer system 500 include a display device 506 for displaying information to a computer user, an alpha-numeric input device 507 (e.g., a keyboard), and a cursor control device 508 (e.g., mouse, trackball, light pen, etc.) for inputting data, selections, updates, etc. Computer system 500 can also include a mechanism for emitting an audible signal (not shown).

Returning still to FIG. 5, display device 506 of FIG. 5 may be a liquid crystal device, cathode ray tube, or other display device suitable for creating graphic images and alpha-numeric characters recognizable to a user. In one embodiment, display device 506 comprises a touch screen display which is configured to detect the location of a user touching a screen. Optional cursor control device 508 allows the computer user to dynamically signal the two dimensional movement of a visible symbol (cursor) on a display screen of display device 506. Many implementations of cursor control device 508 are known in the art including a trackball, mouse, touch pad, joystick, or special keys on alpha-numeric input 507 capable of signaling movement of a given direction or manner displacement. Alternatively, it will be appreciated that a cursor can be directed and/or activated via input from alpha-numeric input 507 using special keys and key sequence commands. Alternatively, the cursor may be directed and/or activated via input from a number of specially adapted cursor directing devices.

Furthermore, computer system 500 can include an input/output (I/O) signal unit (e.g., interface) 509 for interfacing with a peripheral device 510 (e.g., a computer network, modem, mass storage device, etc.). Accordingly, computer system 500 may be coupled in a network, such as a client/server environment, whereby a number of clients (e.g., personal computers, workstations, portable computers, minicomputers, terminals, etc.) are used to run processes for performing desired tasks.

Presentation Interaction

Figure 6:
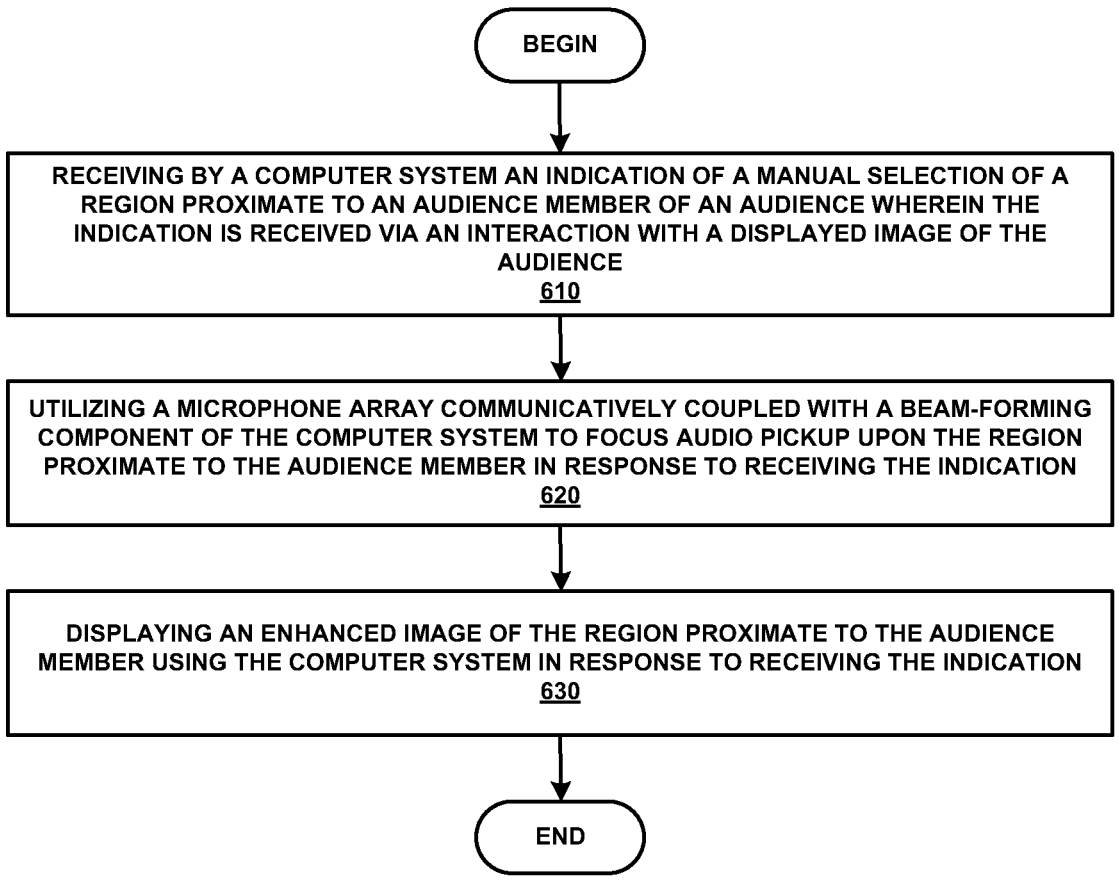
FIG. 6 is a flowchart of an example method of presentation interaction in accordance with an embodiment.

FIG. 6 is a flowchart of an example method 600 of presentation interaction in accordance with an embodiment. In operation 610, a computer system receives an indication of a manual selection of a region proximate to an audience member of an audience wherein the indication is received via an interaction with a displayed image of the audience. The following discussion will refer to FIGS. 3A, 3B, 4A, and 4B, to more clearly describe embodiments discussed herein. In one embodiment, a presenter has a computer system (e.g., computer system 500 of FIG. 5) which is displaying meeting space 100. Referring now to FIG. 4A, a displayed image 401 is shown in which a plurality of audience members (e.g., audience members 110a, 110b, and 110c) are displayed. Displayed image 401 is viewed by the presenter using computer system 500. In one embodiment, the presenter uses computer system 500 to manually select an audience member (e.g., audience member 110a) who is attempting to speak at a meeting. It is noted that while the presenter may intend to indicate the selection of a particular audience member, it is not necessary for the presenter to precisely identify a particular audience member using computer system 500. Instead, the presenter can indicate the general direction to a particular audience member, or group of audience members. Thus, indicating a region proximate to a selected audience member is sufficiently precise for presentation management system 204 select for presenting an enhanced image. Selection of a particular audience member, or a region proximate to a particular audience member, can be accomplished by manipulating a user interface of computer system 500 using, for example, a mouse, touchpad, trackball, or other device configured to control the movement of a cursor within displayed image 401. When the cursor is directed over the selected audience member, or a region proximate to a particular audience member, the user of computer system 500 uses the cursor control device to indicate that the audience member has been selected. Alternatively, if display device 506 of computer system 500 comprises a touch-screen display, the presenter can simply touch the portion of displayed image 401 which shows the selected audience member, or a region proximate to the selected audience member. Again, it is noted that computer system 500 can be used by a presenter who is in the same room (e.g., meeting space 100) as the selected audience member, or can be remotely located such in another building/city/country and who is accessing the event at meeting space 100 via a video conferencing system. In one embodiment, computer system 500 can be used to control the playback of a previously recorded meeting.

It is noted that the presenter can view multiple instances of displayed image 401. For example, if the presenter is conducting a meeting which is simultaneously viewed by a second audience at a remote location, the presenter can simultaneously view a first image 401 of an audience in the same room that the presenter is in, while also viewing a second image 401 of an audience at a remote location. These instances of displayed image 401 can be stacked to show wide-angle views of each of the meeting spaces which are being used by the conference participants. In other words, one view per location is presented to the presenter. Thus, if an audience member at the same meeting space in which the presenter is in begins speaking, the presenter touches a portion of the first displayed image 401 to manually select that audience member. If an audience member at the remote location begins speaking, the presenter touches a portion of the second displayed image 401 to manually select that audience member as described above. This facilitates interaction between the selected audience member and the presenter because presentation management system 204 will present enhanced audio and video capture of the selected audience member to the presenter via computer system 500. This is especially beneficial if the audience member is at the back of a large room and would not be easily seen by the presenter using computer system 500.

In one embodiment, presentation management system 204 comprises a data file 203. Data file 203 maps, or correlates, a direction and a distance within meeting space 100 to a pixel or pixels of displayed image 401. In one embodiment, when meeting space 100 is first set-up with presentation system 200, the direction from microphone array 101 and/or image capture device 102 to positions throughout meeting space 100 can be measured. In one embodiment, the direction and distance from microphone array 101 and/or image capture device 102 to positions throughout meeting space 100 can be measure. Thus, if the arrangement of seats in meeting space 100 is known in advance, the direction, and optionally the distance, from microphone array 101 and/or image capture device 102 can be measured and stored in data file 203. In addition, the pixel position within displayed image 401 to each of these measured positions can also be stored in data file 203. In other words, for each position at which an audience member will be seated the direction, and optionally the distance to that position, as well as the location of the pixels displaying that position within displayed image 401, is mapped and correlated in data file 203. Alternatively, the direction, and optionally the distance to regions within the meeting space, rather than to each seat within the meeting space, can be mapped. When of the presenter uses computer system 500 to view displayed image 401 and indicates the selection of a region proximate to audience member 110a, presentation management system 204 will determine which pixel(s) of displayed image 401 the user has selected (e.g., based upon the position of a displayed cursor, or upon which portion of the display the user has touched). Using this information, presentation management system 204 uses the information in data file 203 to determine the direction, and optionally the distance to the selected audience member. It is noted that an approximate direction and distance to positions in meeting space 100 may be sufficient to provide a "good enough" solution (e.g., ±5 feet, ±5 degrees of azimuth, etc.) to the direction and distance to positions in meeting space 100.

Current solutions often implement an automatic system in which a camera and/or microphone array is automatically steered in the direction of a speaker. However, these automatic systems are prone to errors. For example, if two or more people begin speaking, an automatic system may pick the wrong person to focus upon. Additionally, if an automatic system incorrectly selects an audience member, it is difficult to get the system to correct itself in order to correctly focus upon the audience member who is speaking. This results in confusion for people watching a display of the meeting, especially if they are viewing the meeting remotely. Additionally, these automatic systems can be easily confused by ambient noise in the meeting space, or by other people conversing who do not intend to be addressing the meeting at large. By using a manual selection of audience members, embodiments described herein overcome this limitation. Furthermore, if the user of computer system 500 incorrectly identifies the audience member who is speaking, he/she can easily select a different audience member since the other audience members are still in view.

In operation 620 of FIG. 6, a microphone array communicatively coupled with a beam-forming component of the computer system is utilized to focus audio pickup from the region proximate to the audience member in response to receiving the indication. In response to receiving an indication that the presenter has selected an audience member, presentation management system 204 configures beam-forming component 201 to focus audio capture in the vicinity of the selected audience member. Again, this can be an operation to focus audio capture in the region selected by the presenter which is proximate to the selected audience member. In one embodiment, using the azimuth information from image capture device 102, or direction and optional distance information from data file 203, beam-forming component 201 can configure the outputs from microphones (e.g., microphones 101a-101h of FIG. 2) to more accurately capture the speech of the selected audience member. It is noted that focusing audio pickup upon a selected audience member comprises enhancing audio pickup from the region in which the selected audience member is located. In other words, it may be sufficient to provide a "good enough" solution (e.g., ±5 feet, ±5 degrees of azimuth, etc.) to the direction and distance of the selected audience member.

Referring now to FIG. 3A, in one embodiment, image capture device 102 is disposed in the center of microphone array 101. As discussed above, beam-forming component 201 can use the knowledge of the viewing angle from image capture device 102 to audience member 110a, as well as the information in data file 203, to determine the time delay of arrival of audio signals to each of microphones 110a-110h. Beam-forming component 201 can then adjust the output of microphones 110a-110h to more accurately capture the speech of the selected audience member. In other words, beam-forming component 201 electronically steers the beam from each microphone of microphone array 101 toward the selected audience member.

Figure 4A:
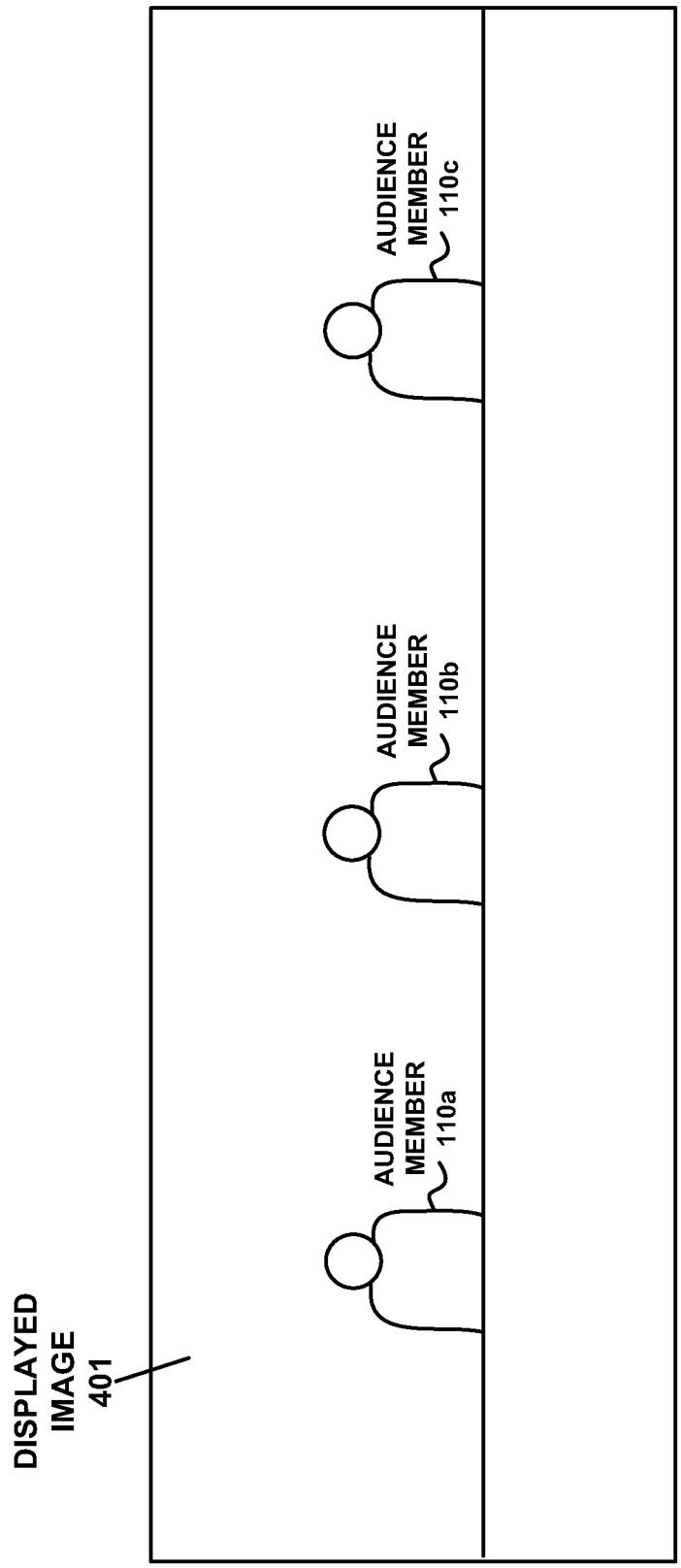
FIGS. 4A and 4B illustrate example displayed images of an audience in accordance with one embodiment.
Figure 4B:
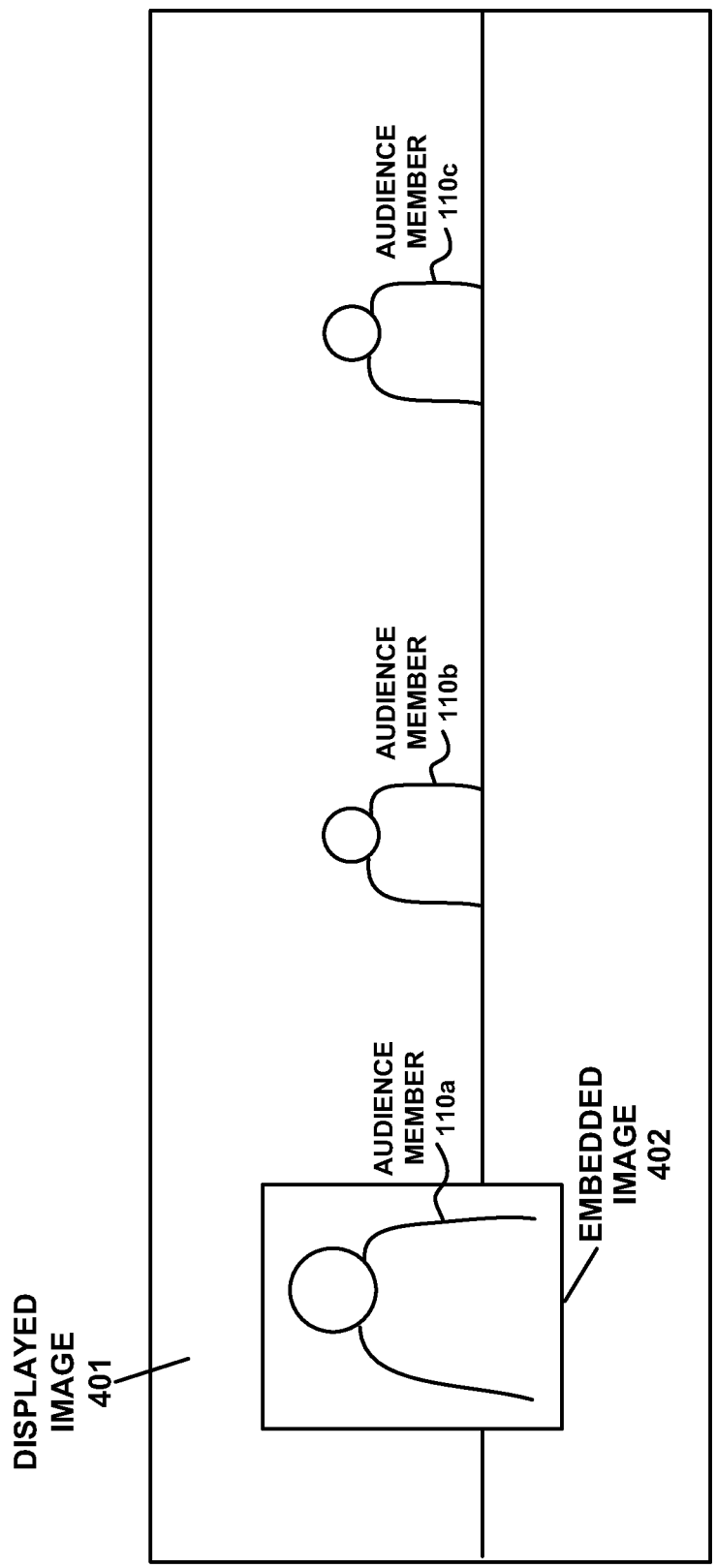

In operation 630 of FIG. 6, an enhanced image of the region proximate to the audience member is displayed using the computer system in response to receiving the indication. In one embodiment, in response to receiving the indication of the selection by the presenter of an audience member, image manipulator 202 of presentation management system 204 controls the output of video images such that an enlarged image of the selected audience member (e.g., audience member 110a) is displayed concurrent with other audience members. Referring now to FIG. 4B, displayed image 401 now shows an embedded image 402 which is a higher magnification image of selected audience member 110a, or the region proximate to selected audience member 110a. As shown in FIG. 4B, the embedded image 402 shows an enlarged image of selected audience member 110a. Furthermore, other audience members and meeting space 100 are still shown in displayed image 401 concurrent with the enlarged embedded image 402 of selected audience member 110a. It is noted that other processing may be selectively applied by image manipulator 202 in embodiments. For example, image manipulator 202 can use face-recognition software to more accurately position the display of selected audience member 110a within embedded image 402. It is further noted that in some embodiments, displayed image 401 can also concurrently display other data as well. For example, the portion of displayed image 401 beneath audience members 110a-110c can be used to display slides, videos, or other information as selected by the presenter using computer system 500. While the example above states that an enlarged image of the selected audience member is displayed, embodiments of the present invention are not limited to this enhancement alone. For example, a box could be displayed around the selected audience member, or some other indication, which highlights the selected audience member, or who currently is speaking. In another embodiment, in response to an indication that an audience member has been selected, image manipulator 202 selects a region around the selected pixel(s) and displays that region at a higher resolution than the rest of the displayed meeting space. For example, in one embodiment, image capture device 102 comprises a high resolution video camera. Often, when streaming data for remote video conferencing, a lower resolution image is used to conserve bandwidth while transmitting data. When an audience member has been selected by the presenter, a higher resolution image of the selected audience member can be displayed by computer system 500. Again, the higher resolution image can be displayed simultaneous with the display of the rest of the audience in meeting space 100 as an embedded image.

Figure 3B:
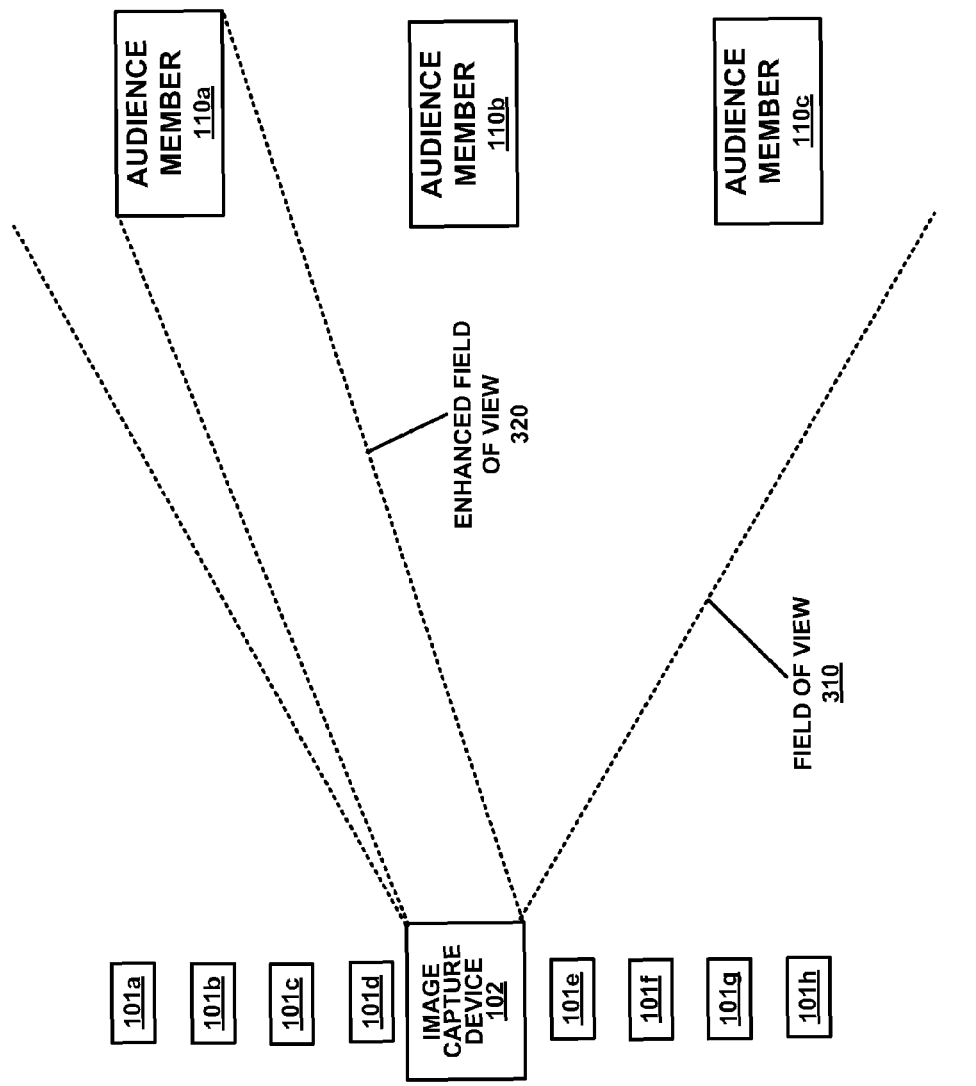

Referring now to FIG. 3B, it is noted that in response to the selection of audience member 110*a*, image manipulator 202 identifies an enhanced field of view 320 which is within field of view 310. The enhanced field of view is identified based upon the pixel(s) selected by a user (presenter) of computer system 500. In one embodiment, image manipulator 202 is configured to identify an audience member at meeting space 100 based upon receiving an indication of a manual selection of that audience member by the presenter using computer system 500.

In one embodiment, a user of computer system 500 can perform the operations described above with reference to method 600 to interactively control the playback of a recorded meeting. In one embodiment, audio and visual capture of the meeting being conducted can be recorded and stored (e.g., in data storage device 505 of computer system 500). Alternatively, the meeting can be stored on a remotely located computer system or data storage system (not shown). In one embodiment, the complete microphone array data from microphone array 101 can be stored. This permits a user who is re-playing the meeting to interactively select an audience member in meeting space 100 change the beam-forming to listen to audio from audience members other than those selected by the presenter. Thus, a user of computer system 500 can view displayed image 401 as shown in FIG. 4A select audience members other than an audience member selected by the presenter when the meeting was being conducted. In response, computer system 500 controls the output of video images during playback such that an enhanced image of the selected audience member is displayed concurrent with other audience members in a manner similar to that shown in FIG. 4B. The TDOA can then be computed to the audience member selected during playback using the set of known positions to further determine proper delay values for beam-forming to the position of the audience member selected during playback. This allows the user to pick up comments or other audience participation which was occurring simultaneous with the actions of the audience member selected by the presenter. In one embodiment, the selections made by the presenter during the meeting are recorded, in addition to the complete microphone array data, to facilitate reproducing during playback the meeting as conducted by the presenter. In another embodiment, the recording of the meeting is simply the beam-formed audio as selected by the presenter when the meeting was conducted. In other words, the playback would not be interactively modifiable during playback.

Various embodiments are thus described. While the subject matter has been described in particular embodiments, it should be appreciated that the subject matter should not be construed as limited by such embodiments, but rather construed according to the following claims.

What is claimed is:

1. A method of presentation interaction comprising:
   receiving by a computer system an indication of a manual selection of a region proximate to an audience member of an audience wherein said indication is received via an interaction with a displayed image of said audience;
   utilizing a microphone array communicatively coupled with a beam-forming component of said computer system to focus audio pickup upon said region proximate to said audience member in response to receiving said indication;
   displaying a first image of said audience using said computer system; and
   displaying a second image of said region proximate to said audience member concurrent with said first image using said computer system in response to receiving said indication, wherein said second image is embedded within said first image using said computer system, and wherein said second image of said region proximate to said audience member is displayed larger than other members of said audience in said first image.

2. The method of claim 1 further comprising:
   accessing a recorded meeting wherein said indication of said manual selection is received via an interaction with a displayed playback of said recorded meeting.

3. The method of claim 2 further comprising:
   storing microphone array data of said meet g; and
   receiving an indication of a manual selection of a region proximate to a second audience member of said audience wherein said indication of said manual selection is received via said interaction with a displayed playback of said recorded meeting.

4. The method of claim 1 further comprising:
   using said beam-forming component to process received audio signals based upon said indication.

5. The method of claim 1 further comprising:
   accessing data which correlates a pixel of said displayed image with a direction to said region proximate to said audience member; and
   using said beam-forming component to process received audio signals based upon said direction to said region proximate to said audience member.

6. A non-transitory computer-readable storage medium having computer-readable instructions embodied thereon which, when executed, cause a computer system to implement a method of presentation interaction comprising:
   receiving by a computer system an indication of a manual selection of a region proximate to an audience member of an audience wherein said indication is received via an interaction with a displayed image of said audience;
   utilizing a microphone array communicatively coupled with a beam-forming component of said computer system to focus audio pickup from said region proximate to said audience member in response to receiving said indication;
   displaying a first image of said audience using said computer system; and
   displaying a second image of said region proximate to said audience member concurrent with said first image using said computer system in response to receiving said indication, wherein said second image of said region proximate to said audience member is embedded within said first image using said computer system, and wherein said second image of said region proximate to said audience member is displayed larger than other members of said audience in said first image.

7. The non-transitory, computer-readable storage medium of claim 6 wherein said method further comprises:
   accessing a recorded meeting wherein said indication of said manual selection is received via an interaction with a displayed playback of said recorded meeting.

8. The non-transitory, computer-readable storage medium of claim 7 wherein said method further comprises:

storing microphone array data of said meeting; and receiving an indication of a manual selection of a region proximate to a second audience member of said audience wherein said indication of said manual selection is received via said interaction with a displayed playback of said recorded meeting.

9. The non-transitory computer-readable storage medium of claim 6 wherein said method further comprises:

using said beam forming component to process received audio signals based upon said indication.

10. The non-transitory computer-readable storage medium of claim 6 wherein said method further comprises:

accessing data which correlates a pixel of said displayed image with a direction to said region proximate to said audience member; and using said beam-forming component to process received audio signals based upon said direction to said region proximate to said audience member.

11. A presentation system comprising:

a computer system comprising a user interface and a display device, said computer system configured to receive an indication of a manual selection of a region proximate to an audience member location from a displayed image of an audience displayed on said display device;

a microphone array communicatively coupled with said computer system;

an image capture device communicatively coupled with said computer system;

a beam-forming component configured to process received signals from said microphone array in response to said indication of said manual selection of said region proximate to said audience member; and an image manipulator configured to display a first image of said audience and a second image of said region proximate to said audience member concurrent with a display of said audience in response to said indication of said manual selection of said region proximate to said audience member, wherein said second image is embedded within said first image and wherein said second image of said region proximate to said audience member is displayed larger than other members of said audience in said first image.

12. The presentation system of claim 11 wherein said microphone array comprises a steerable microphone array configured to capture audio pickup from said region proximate to said audience member and wherein said computer system controls the movement of said steerable microphone array in response to said indication.

13. The presentation system of claim 11 wherein said image capture device comprises a steerable image capture device configured to capture an image of said region proximate to said audience member and wherein said computer system controls the movement of said steerable image capture device in response to said indication.

14. The presentation system of claim 11 wherein said image manipulator is configured to display said audience as a first image and to concurrently display said region proximate to said audience member as a higher resolution image.

15. The presentation system of claim 14 wherein image manipulator is configured to display said higher resolution image as an embedded image within said first image.

16. The presentation system of claim 11 wherein said computer system is configured to access data which correlates a pixel of said image with a direction to said region proximate to said audience member and wherein presentation system said beam-forming component to process received audio signals based upon said direction to said region proximate to said audience member.

\* \* \* \* \*

UNITED STATES PATENT AND TRADEMARK OFFICE
CERTIFICATE OF CORRECTION

PATENT NO.         : 8,558,894 B2
APPLICATION NO.    : 12/947191
DATED              : October 15, 2013
INVENTOR(S)        : Kar-Han Tan et al.

Page 1 of 1

It is certified that error appears in the above-identified patent and that said Letters Patent is hereby corrected as shown below:

In the Claims:

In column 10, line 21, in Claim 3, delete "meet g;" and insert -- meeting; --, therefor.

In column 10, line 61, in Claim 7, delete "non-transitory," and insert -- non-transitory --, therefor.

Signed and Sealed this
Eleventh Day of February, 2014

Michelle K. Lee
*Deputy Director of the United States Patent and Trademark Office*